March 18, 1947.  C. C. JACKSON  2,417,500
HARVESTING MECHANISM
Filed Aug. 24, 1943
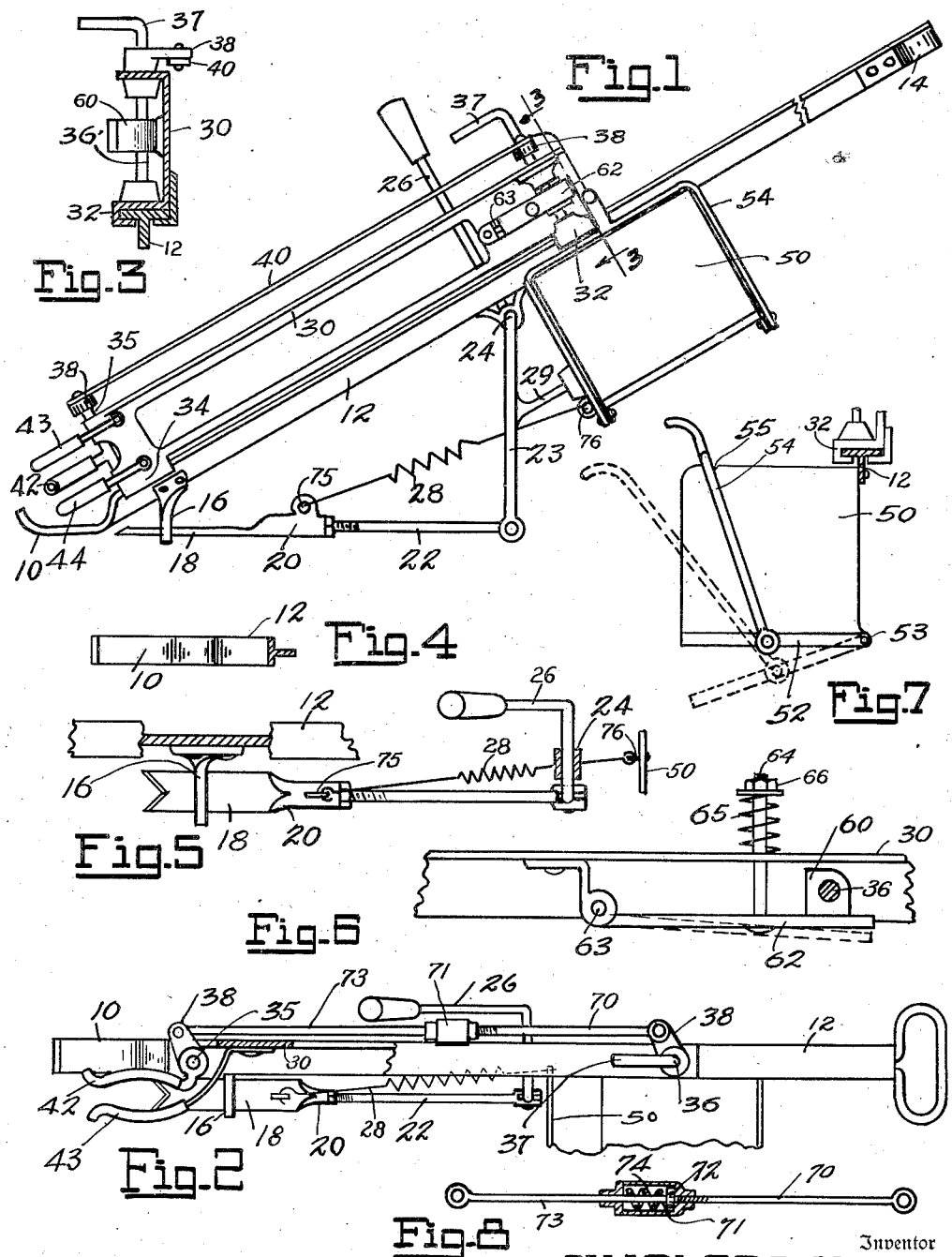
Inventor
CHARLES C. JACKSON
By Herbert E. Smith
Attorney Patented Mar. 18, 1947

2,417,500

UNITED STATES PATENT OFFICE 2,417,500

HARVESTING MECHANISM

Charles C. Jackson, Pomeroy, Wash.

Application August 24, 1943, Serial No. 499,805

2 Claims. (Cl. 56—327)

This invention relates to improvements in a harvester mechanism and, more particularly, to a mechanism useful in cutting and harvesting asparagus and other similar crops.

It is well known that hand harvesting of certain of our edible crops is a back-breaking and tedious operation, due to the fact that the vegetable matter grows close to the ground and must be cut at the ground level in a manner that requires the harvester to operate in a bent over position or on his knees. It is also well known that the harvesting operation must be carried on with great speed but at the same time with a minimum of bruising and slashing to the crop.

It is an important object of this invention to provide a mechanism for harvesting crops close to the ground, which mechanism is simple to construct and efficient in operation.

It is a further object of this invention to provide a harvesting mechanism which will efficiently cut and handle asparagus without injury to the same, even though the operation be effected at high speed.

Another object of my invention is to provide, in a harvester of the type described, crop gripping elements which will readily engage about the stalk of material being harvested and handle the same during cutting as well as during subsequent depositing in suitable containers.

The foregoing objects and others ancillary thereto I prefer to accomplish as follows:

According to a preferred embodiment of my invention, I provide a ground shoe and an upwardly directed arm to be manually moved with relation to the crop being harvested. On the arm is carried the cutting knife mechanism which depends from the arm and is movable with relation to the shoe. There is provided means for reciprocating the knife. Also carried by the arm is a receptacle into which the harvested crop is deposited for accumulation until a sufficient quantity has been gathered for deposit into crates or other ancillary and supplemental containers. In addition to the foregoing, the arm above mentioned carries a gripping mechanism which engages around and holds the vegetable matter being harvested during the cutting operation. Said gripping mechanism is also movable with respect to the point where the cutting operation occurs to deposit the harvested crop in the receptacle.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which Figure 1 is a view in side elevation of my harvester mechanism;

Figure 2 is a plan view of the mechanism of Figure 1 with portions broken away for convenience of illustration and showing an adjustable link as per Figure 8;

Figure 3 is a view in section taken on line 3—3 of Figure 1;

Figure 4 is a fragmentary plan view of the ground engaging shoe of the harvester mechanism;

Figure 5 is a detail view of the cutter mechanism;

Figure 6 illustrates a detent employed in connection with the gripping fingers of the harvester mechanism;

Figure 7 is a detail view of the accumulator receptacle; and

Figure 8 is a view of modified form of drag link employed in connection with the crop gripping fingers.

According to a preferred embodiment of my invention shown in the drawings, the numeral 10 indicates a ground engaging shoe above which, at an angle that is generally rearward, is mounted a carrier arm 12 having a handle 14 for manually gripping the arm and by which the shoe 10 is advanced over the ground. Arm 12 is here shown as T-shaped in cross-section. Carried to one side and slightly rearward of the shoe 10 on the arm 12 is a guide clip 16 in which reciprocates the blade 18 of the knife 20 mounted on the push bar 22. The knife is reciprocally moved through swinging of the crank arm 23 that is pivoted in bearing 24. The arm 23 is caused to swing by manual movement of the handle 26. A return spring is indicated at 28 and 29 designates a stop for arm 23 when moved by said spring. One end of the spring 28 is fastened in an eye 75 formed on the knife 20. The other end of the spring is secured by an eye bolt 76 to a receptacle 50.

It will be seen that rearward movement of the handle 26 through the instrumentality of the operator will cause the arm 23 to swing forward against the biased spring 28 to advance the knife 18 against a vegetable stalk at which it may be directed.

The arm 12 is here shown as comprising a T-iron which has its leg directed downward and the two flanges of the cross-head serving as guide rails for a purpose later to be described.

A frame 30 is disposed above the arm 12 and has carriage slides 32 and 34 engaged over the edges of the crosshead of the T-iron 12 to act as sliders thereon. At opposite ends the frame 30 has a pair of pivotally mounted shafts 35 and 36, each of which has on its upper end a crank arm 38 connected by the link 40 for mutual movement. The upper end of the shaft 35 is bent over to form a handle 37 which when manually turned causes the cranks 38, 38 to move in parallelism.

The shaft 35 supports the movable finger 42 that upon movement, is interposed between the semi-resilient spring fingers 43 and 44, or at least theretoward to grip a stalk of asparagus. A stalk so gripped is cut when the operator causes the knife 18 to move forward and sever the stalk from its root structure. The severed stalk still between the gripping fingers 42, 43 and 44 is caused to move upward on the inclined arm 12 to a position where it is deposited in receptacle 50 mounted to one side and below the arm 12. This movement is effected by sliding of the carriage 30 on the arm 12.

Receptacle 50 is open at the top and bottom, the latter being closed by a bottom plate 52 hinged at 53 and having a swinging bail 54 which, in the closed position, engages in a notch 55 in the upper edge of the wall of the receptacle. When the bail is displaced out of the notch 55 to the dotted line position as shown in Figure 7, the bottom can drop and the contents may be deposited as desired.

The shaft 36 is provided with a multi-faced cam 60 against which is resiliently urged the follower bar 62 that is pivoted at 63 and resiliently retained by the bolt 64 under the urgence of spring 65 that lies between the nut 66 and the frame member 30. By this arrangement the finger 42 is retained either in the open or in the closed position, depending on which angle of the cam 60 is presented to the retainer bar 62.

In Figure 8 a modified form of the link 40 is indicated. In this instance the link is divided and one link section 70 is rigidly joined to a cylinder 71 which encloses a head 72 on link 73. The link is urged into contraction as to overall length by means of the spring 74 within the housing 71 pressing against the inner end surface of the housing and against the head 72.

Having thus described my invention, I claim:

1. A harvesting mechanism, comprising: an arm disposed at an angle to the ground surface and having a ground engaging member, knife means mounted on said arm for reciprocal movement, a carriage movable on said arm from a lower to an upper position, crop-gripping means on said carriage in crop-gripping position relative said knife when the carriage is in the lower position, a receptacle on said arm in crop-receiving position when the carriage is moved to place the crop-gripping means adjacent thereto, means for operating said crop-gripping means, and means for reciprocating said knife.

2. A harvesting mechanism, comprising: an arm disposed at an angle to the ground surface and having a ground engaging member, knife means mounted on said arm for reciprocal movement, means on said arm for reciprocating said knife, a carriage slidable upon said arm and supporting on its lower end crop-gripping means, said crop-gripping means including a pair of resilient fingers and another finger movable therebetween, means at a remote point on said carriage for moving said movable finger, means for securing said movable finger in gripping position relative said resilient fingers, and a receptacle adjacent said carriage and in the path of movement of a stalk gripped by said fingers when the carriage is moved.

CHARLES C. JACKSON.

REFERENCES CITED

The following references are of record in the file of this patent:

UNITED STATES PATENTS

| Number | Name | Date |
|---|---|---|
| 414,842 | McDonald | Nov. 12, 1889 |
| 625,163 | Haerst | May 16, 1899 |
| 1,378,275 | Rademacher | May 17, 1921 |
| 2,188,768 | Demory | Jan. 30, 1940 |
| 1,137,777 | Moore | May 4, 1915 |

FOREIGN PATENTS

| Number | Country | Date |
|---|---|---|
| 195,832 | Bock (German) | Apr. 23, 1907 |